(12) United States Patent
Barke

(10) Patent No.: US 7,473,836 B2
(45) Date of Patent: Jan. 6, 2009

(54) PRACTICE AID DEVICE FOR PERCUSSIONISTS

(76) Inventor: Steven J. Barke, 11807 Selfridge Rd., Silver Spring, MD (US) 20906

( * ) Notice: Subject to any disclaimer, the term of this patent is extended or adjusted under 35 U.S.C. 154(b) by 157 days.

(21) Appl. No.: 11/194,447

(22) Filed: Aug. 2, 2005

(65) Prior Publication Data

US 2006/0027076 A1 Feb. 9, 2006

Related U.S. Application Data

(60) Provisional application No. 60/599,039, filed on Aug. 6, 2004.

(51) Int. Cl.
*G10D 13/02* (2006.01)
(52) U.S. Cl. ................................. 84/422.4
(58) Field of Classification Search ............... 84/411 R, 84/320–322, 422, 4, 421, 422.4
See application file for complete search history.

(56) References Cited

U.S. PATENT DOCUMENTS

| | | | |
|---|---|---|---|
| 3,365,108 A * | 1/1968 | Giba | 224/217 |
| 3,859,887 A | 1/1975 | Buchanan | |
| 4,982,641 A * | 1/1991 | Duhart | 84/329 |
| 5,581,031 A * | 12/1996 | Blankenship, Jr. | 84/453 |
| 5,744,737 A | 4/1998 | Carter | |
| 6,414,230 B2 * | 7/2002 | Randall | 84/470 R |
| 6,810,531 B1 * | 11/2004 | Lento | 2/159 |
| 7,176,369 B1 * | 2/2007 | Brooks | 84/422.4 |
| 2002/0002895 A1 * | 1/2002 | Zbrzezny et al. | 84/422.4 |

* cited by examiner

*Primary Examiner*—Kimberly R Lockett
(74) *Attorney, Agent, or Firm*—McDermott Will & Emery LLP

(57) ABSTRACT

A practice aid device for musicians, especially percussionists, arranged to help develop and perfect a proper drumstick gripping technique, wherein a spacer is used to maintain the space that is formed between the thumb and forefinger when correct gripping technique is being employed. With the spacer in place, the percussionist will be able to memorize the position and feel of the drumstick in the fingers while also preventing the drumstick from slipping. The device may be accompanied by a drum rudiment chart presenting multiple drum practice exercises.

14 Claims, 6 Drawing Sheets

Rudiment Chart

Fig. 6

PRACTICE AID DEVICE FOR PERCUSSIONISTS

RELATED APPLICATION

This application claims the benefit under 35 U.S.C. § 119(e) of U.S. Provisional Patent Application No. 60/599,039, filed on Aug. 6, 2004, entitled "Practice Aide for Percussionist's," which is incorporated by reference herein in its entirety

TECHNICAL FIELD

This disclosure relates generally to gripping technique and finger control associated with striking musical instruments with drumsticks, and the like. The disclosure relates more specifically to novel implementation of a spacer between the thumb and forefinger to maintain optimum gripping during drumming.

BACKGROUND OF THE INVENTION

It is widely known in the professional percussion field that in order to attain technical efficiency on the drums, hand technique is crucial. By means of match grip technique, and when held correctly in the fingers, a drumstick or other striking device is placed in the joint between the distal and middle phalanges of the forefinger and the distal phalange of the thumb. The remaining fingers rest gently around the stick. When this is done, a space is created between the proximal phalanges of the thumb and the forefinger. This space is important because, if maintained, it will permit the stick to bound freely on the pivot or fulcrum point.

A drumstick is normally cylindrical in shape and can vary greatly in length and thickness. However, it often will have a butt end, a striking end and a middle section, termed the shaft. The fulcrum is located approximately one-third down the shaft from the butt end.

There is a need to address a common problem among drummers of allowing the drumstick to slip down to the middle or proximal phalange of the forefinger, thus closing the aforementioned space, forcing the drummer to grasp the drumstick with all his or her fingers. This slipping in the fingers usually occurs when playing at loud volumes, playing for long periods of time or, in some cases, lack of having been properly trained. Many drummers think they have full control of the drumstick in the hand when grasping with all the fingers. However, the stick tends to repeatedly rub between the forefinger and thumb, causing blisters. Also, when one grasps the drumsticks with all the fingers, unneeded tension in the hands and arms tends to occur, often resulting in muscle spasms, tendonitis and in most severe cases, carpal tunnel syndrome.

Carpal tunnel syndrome occurs when the median nerve that innervates the thumb, forefinger, middle finger and ring finger becomes pressed upon due to swollen or inflamed tissue, causing pain. A narrow tunnel formed by the bones and other tissues of your wrist, called the carpal tunnel, normally protects the medium nerve. Unnatural wrist positions or high repetitive wrist and finger movements generally cause carpal tunnel syndrome.

Even with wide awareness of problems that occur while performing with poor drumstick gripping technique, the industry has yet to produce a device that can help the drummer learn how to hold the stick correctly, thus deterring the physical problems aforementioned.

Prior solutions of which I am aware focus on redesigning the shape of the drumstick to make the stick less likely to slip in the fingers. In U.S. Pat. Application No.2002/0002895A1 to Zbrzezny et al, the shape of the drumstick is modified to have a more hexagonal or octagonal than cylindrical shape. This form of stick is said to fit better in the fingers, thus deterring the drumstick from slipping. The described approach is not universally applicable to various shapes and sizes of drumstick.

U.S. Pat. No. 3,859,887 to Buchanan describes a gripping device of a saddle-shaped formation that is pivotally connected to the drumstick by a metal pivot pin. This approach, however, does allow the drummer to feel how the stick pivots on the correct fulcrum point. And it does not allow the drummer to have direct contact with the drumstick, thus preventing the drummer from identifying the correct pinch pressure needed.

Some implements, such as is described in U.S. Pat. No. 5,744,737, apply weights to strengthen the muscles in the hand used when drumming, but do not address proper drumstick gripping technique.

SUMMARY OF THE DISCLOSURE

In accord with the principles taught herein, a percussion instrument practice device, provided to address the deficiencies of the prior art, comprises a spacer adapted to fit in a space between the thumb and forefinger of a user, sized and shaped to maintain a correct drumstick holding technique (e.g., prescribed separation between thumb and forefinger) during drumming. The spacer may be generally teardrop-shaped or wedge-shaped to have a diameter that varies along the length of the spacer. Preferably, the length to maximum width ratio of the spacer is greater than unity.

The device may include a tether for connecting the spacer to a portion of the user's hand or wrist, and may advantageously further include a band joined to the tether and sized to connect to the user.

Another aspect of the disclosure is in a kit for teaching correct drumstick holding technique, comprising a spacer adapted to fit in a space between the thumb and forefinger of a user, sized and shaped to maintain the correct drumstick holding technique during drumming, a tether for connecting the spacer to a portion of the user's hand or wrist, and a rudiment chart for drilling the user while holding the spacer during drumming.

Still another aspect of the disclosure is in a method of developing and maintaining correct drumstick holding technique. The method comprises positioning a spacer between the thumb and forefinger so as to maintain an appropriate spacing there between; and drumming while holding the spacer. The spacer preferably is of a diameter that varies with its length. The axial position of the spacer is adjusted within the hand for proper spacing between thumb and forefinger. The method may include practicing a prescribed series of drum rudiments while holding the spacer.

Additional advantages of the teachings herein will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present subject matter is illustrated by way of example, and not by way of limitation, in the figures of the accompanying drawing and in which like reference numerals refer to similar elements and in which:

FIG. 6 is an exemplary rudiment chart, that may be used with the described system.

DETAILED DESCRIPTION

Figure 1A:
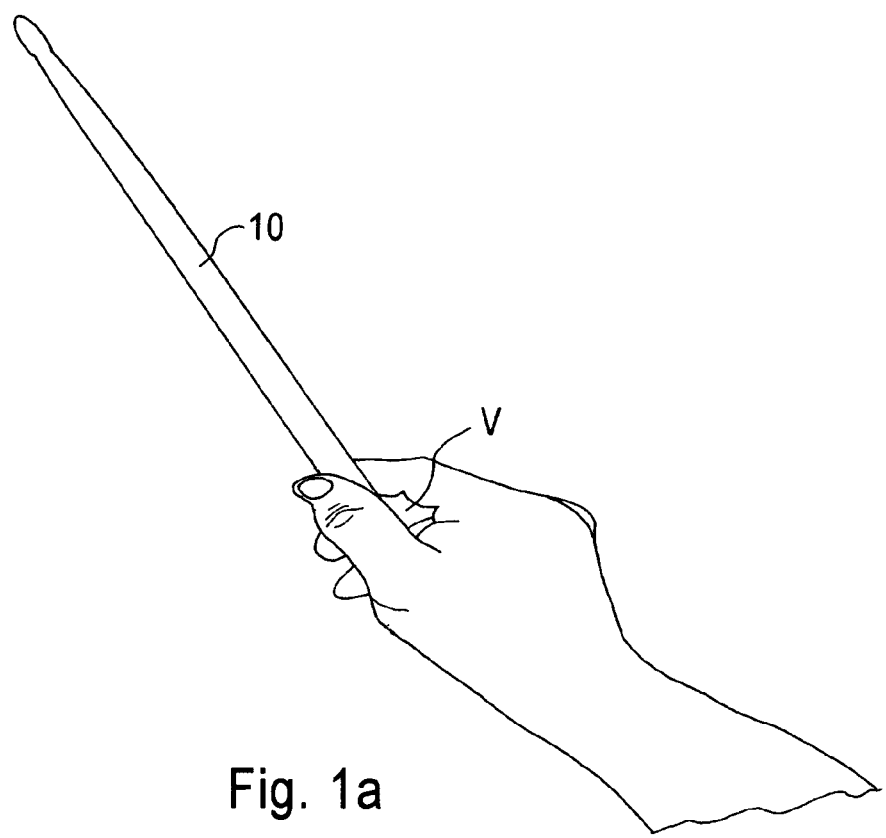
FIGS. 1a and 1b show proper placement of a drumstick in the hand, with void established between thumb and forefinger.
Figure 1B:
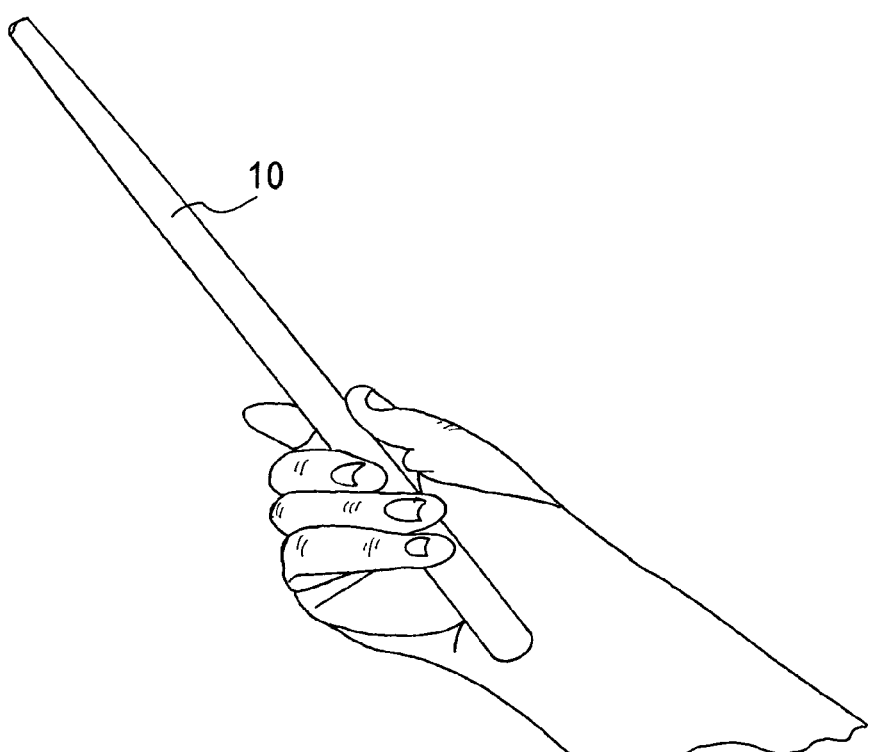

Referring to FIGS. 1a and 1b, proper placement of the drumstick in the hand of a drummer is established with the thumb and fingers positioned as depicted, bowed slightly and contacting the stick with the distal phalange of the thumb and the joint between the distal and middle phalanges of the forefinger to establish a void V. In this position, as can be appreciated, the drumstick is able to pivot about a fulcrum established by the thumb and forefinger, while enabling the remaining fingers unrestrained to control the stick freely. This hand position, although optimum, is difficult to achieve and sustain while drumming, tending to diminish controllability of the stick, and create physical problems in relation to the hand, as aforementioned.

Figure 2A:
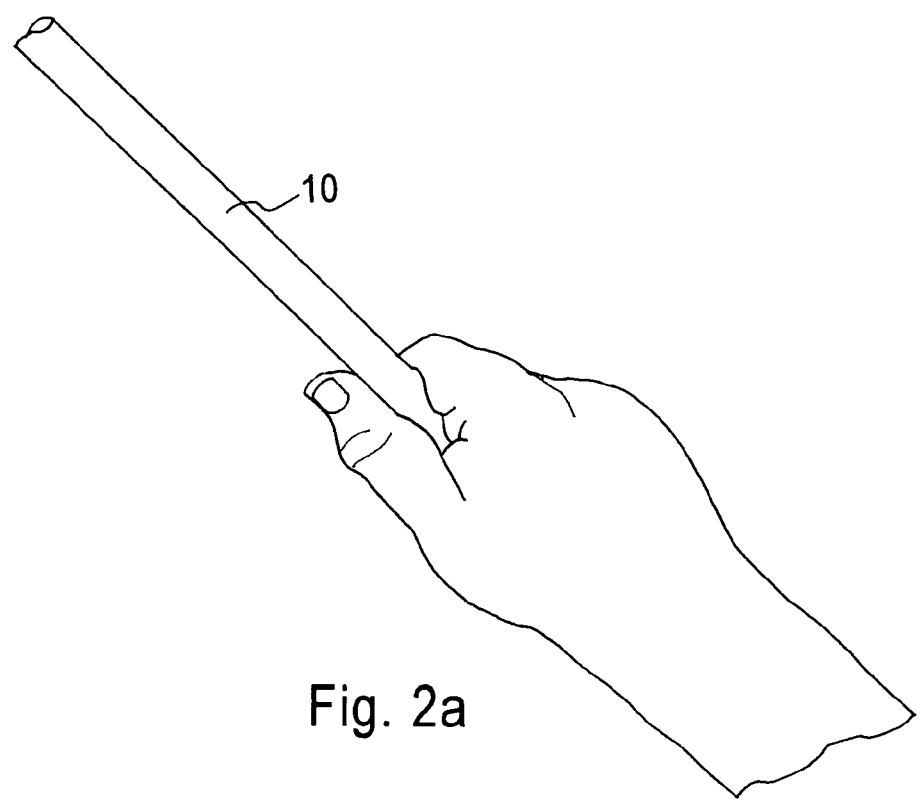
FIGS. 2a and 2b show improper drumstick placement in the hand.
Figure 2B:
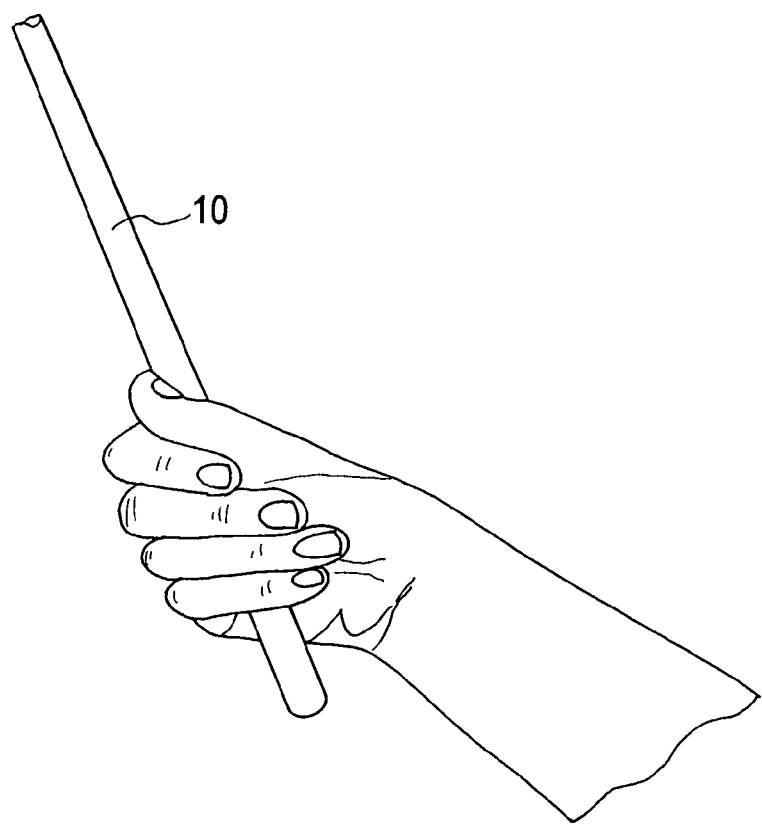

FIGS. 2a and 2b show improper placement of the drumstick 10 in the hand, that tends to occur when the drumstick slips in the fingers, causing the void V to close. In these figures, the drumstick 10, rather than being adjoined between the distal and middle phalanges of the forefinger and the distal phalange of the thumb, has slid between the proximal phalange of the forefinger and the proximal phalange of the thumb. When this occurs, in order to play with sufficient power and speed, the drummer is forced to grasp the stick tightly with all fingers, creating excessive force between fingers and thumb, and hence the formation of blisters, etc.

Figure 3:
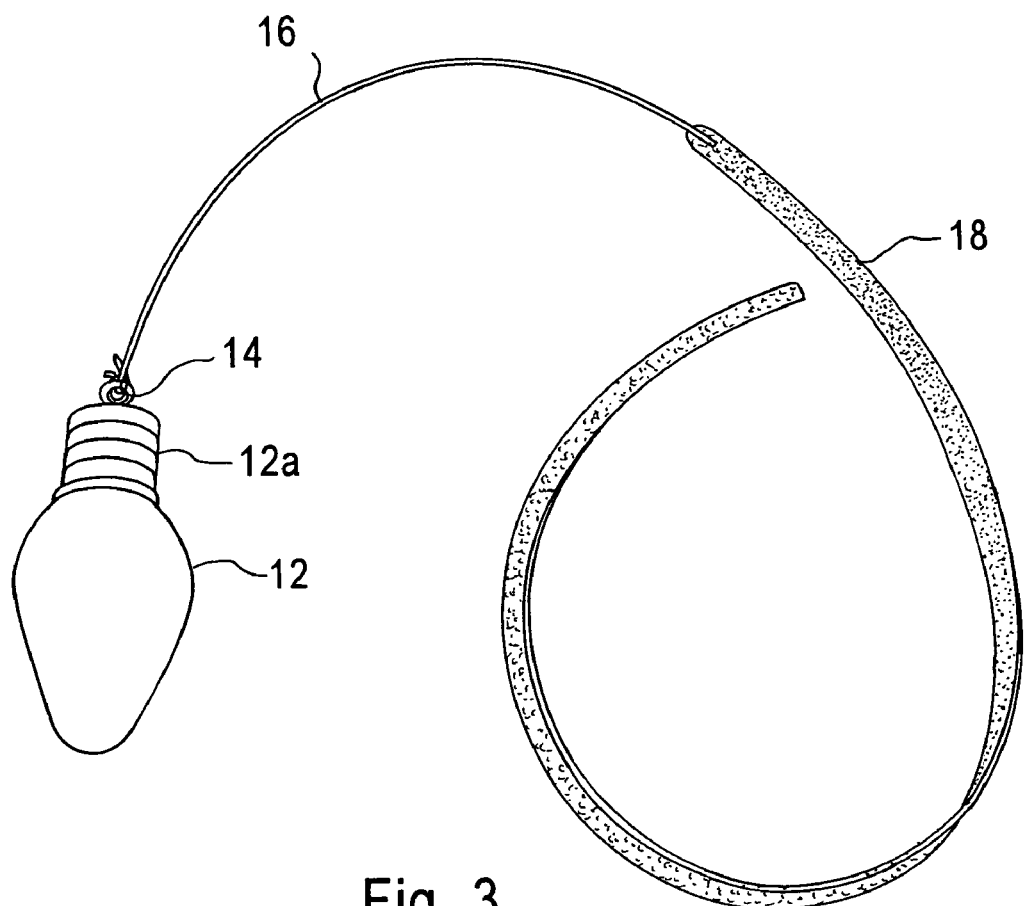
FIG. 3 is a perspective view of an illustrative embodiment a teaching and practicing device, in accord with the disclosure.
Figure 5A:
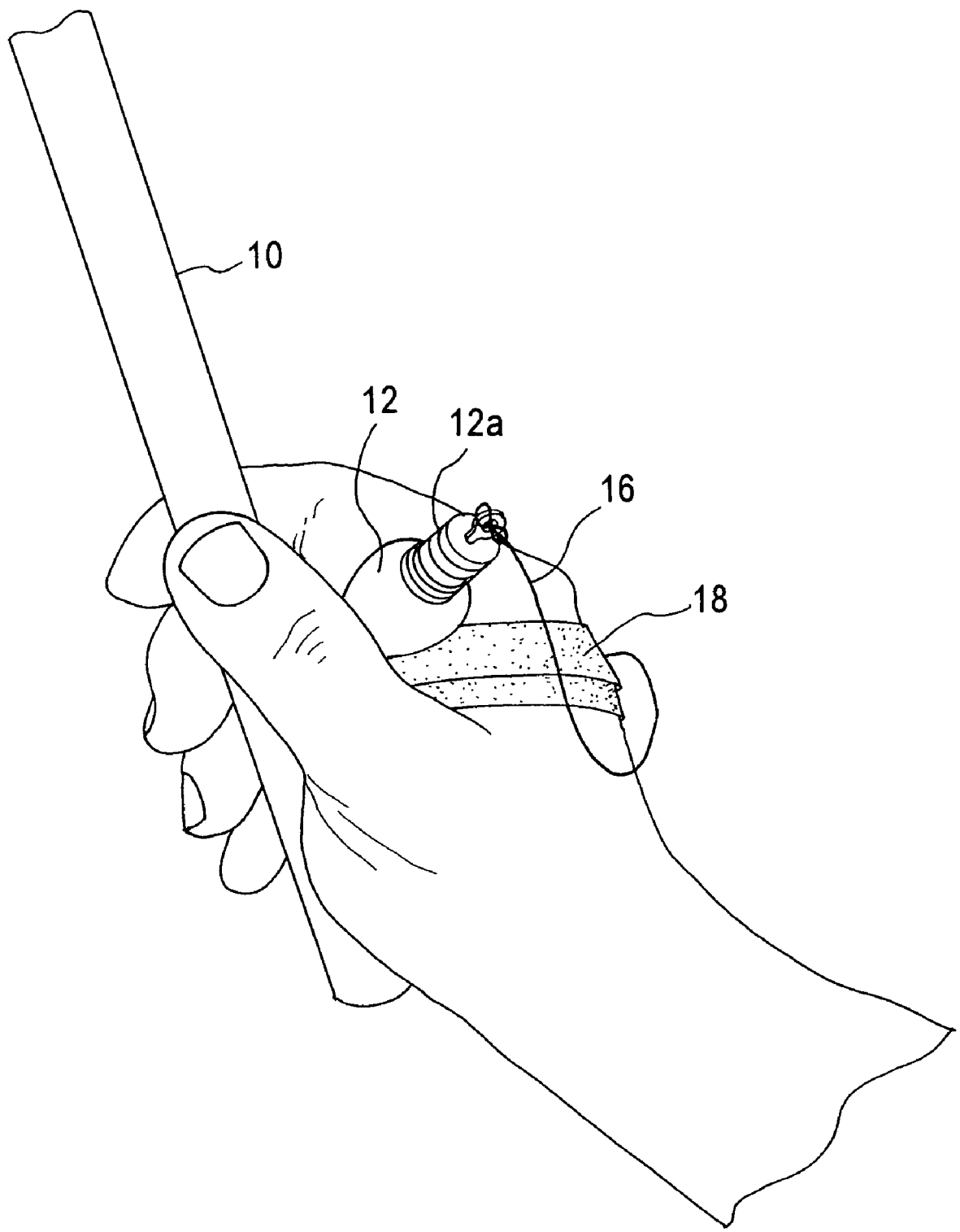
FIGS. 5a and 5b show the device tethered to the hand and wrist, respectively.
Figure 5B:
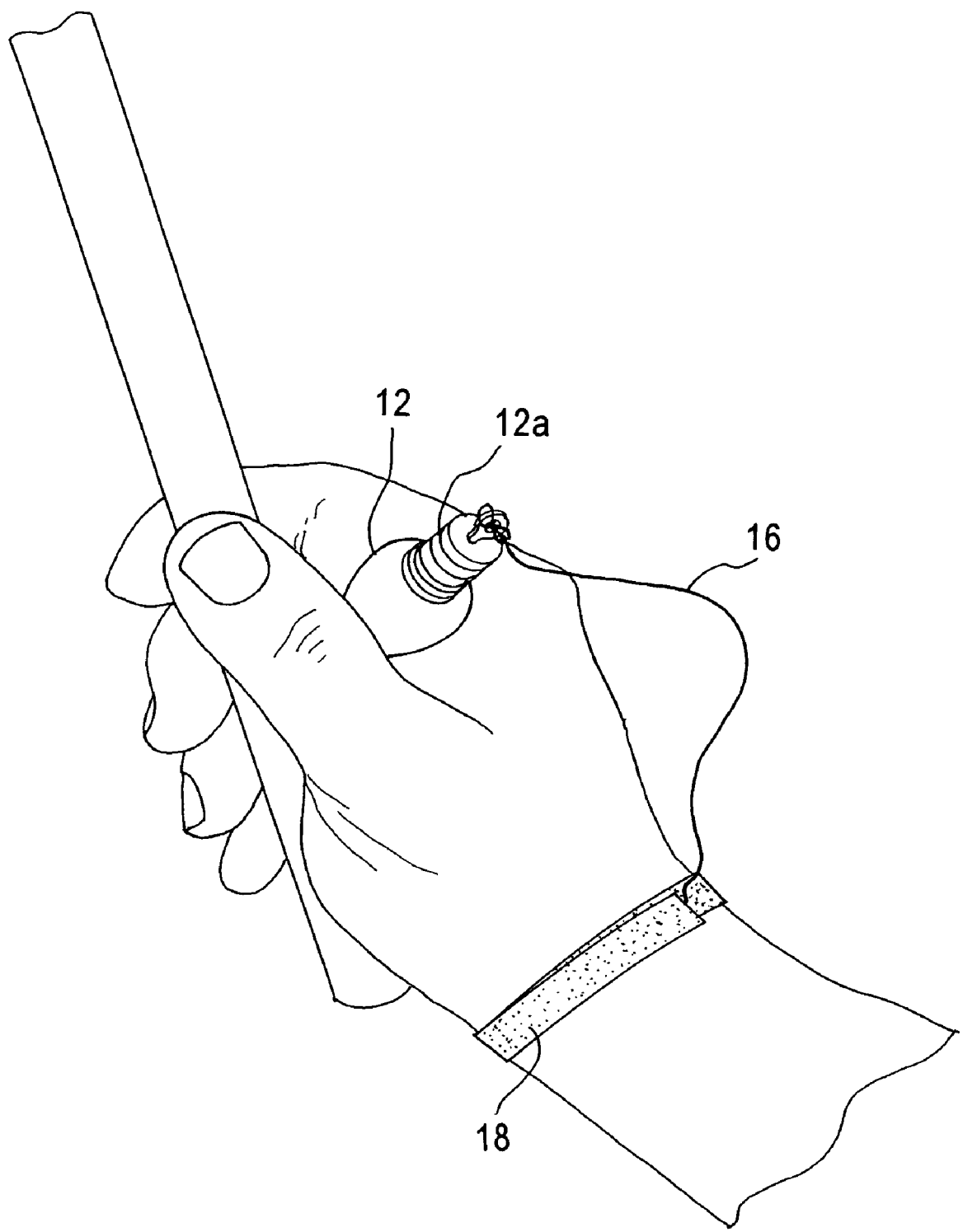

A device for training the hand to maintain the correct grip is shown in Fig 3, in which a shaped device 12 is provided, and implemented as depicted in FIGS 5a and 5b. Device 12 is provided as a spacer to maintain the void as created when drumstick 10 is held properly between the thumb and forefinger. More specifically, with reference to FIG. 5a, the device 12 seats in the joint between the medial and proximal phalanges of the forefinger and the proximal phalange of the thumb, enabling the remaining fingers to rest gently on the drumstick 10 at the fulcrum that is approximately one-third down from the shaft from the butt of the drumstick 10.

Figure 4:
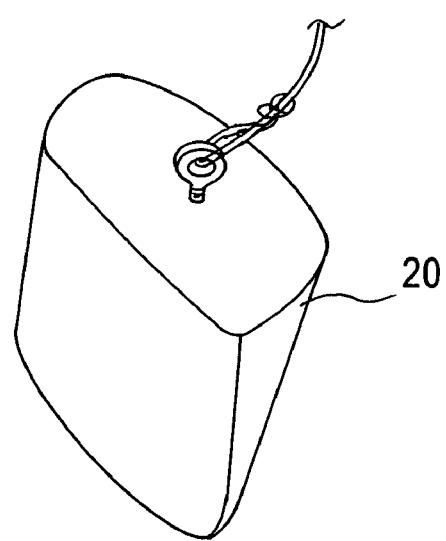
FIG. 4 shows another embodiment of the device.

The device 12 is shaped to have a diameter that varies along its length, as depicted in FIG. 3 in which the device is presented by way of example to have a teardrop or bulbous configuration, with stem 12a of lesser diameter, convenient for handling. The configuration is depicted in FIG. 3 as being arcuate, but that is not necessary. For example, FIG. 4 depicts an embodiment in which device 12 is wedge-shaped (identified by reference 20). In each example, the length of the device preferably is greater than its maximum width.

Device 12 or 20 can be made of any suitable material that maintains its shape when used as intended. For example, the device 12 or 20 may be formed of wood, rubber, fiberglass or a silicon material, by way of example. If wood, the device 12 or 20 may be lathed (in the case of device 12) into the desired configuration. Other materials may be molded into shape.

Device 12 or 20 may optionally be tethered to the hand or wrist. In FIG. 3, a line or tether 16 is connected between a small loop 14 on base 12a of the spacer device and a band 18 adapted to wrap around the hand, wrist or finger of the user. The band 18 may be made of a stretchable material, or partly or entirely of a filamentary fastener material. Alternatively, the band may be preformed into a loop of prescribed diameter. Examples of materials from which the tether may be made include yarn, leather, rubber and synthetic fiber. The band may be made of leather, cloth or synthetic fiber as well as from a filamentary fastening material. These are only examples.

The provision of tether 16 is optional. However, as the device 12 has a tendency to slip from the hand, especially during initial training, the tether is convenient as it enables the drummer to nearly instantaneously replace the device 12 in position within the hand.

In use, the device 12 is positioned as described previously, and depicted in FIGS. 5a and 5b, tethered to an appropriate location on the hand, wrist or to a finger (not shown). The diameter of the void between thumb and forefinger is adjustably controlled simply by moving the device 12 axially into or away from the hand, guided by an instructor or the drummer himself or herself, and also for comfort. Device 20 is used similarly.

Figure 6:
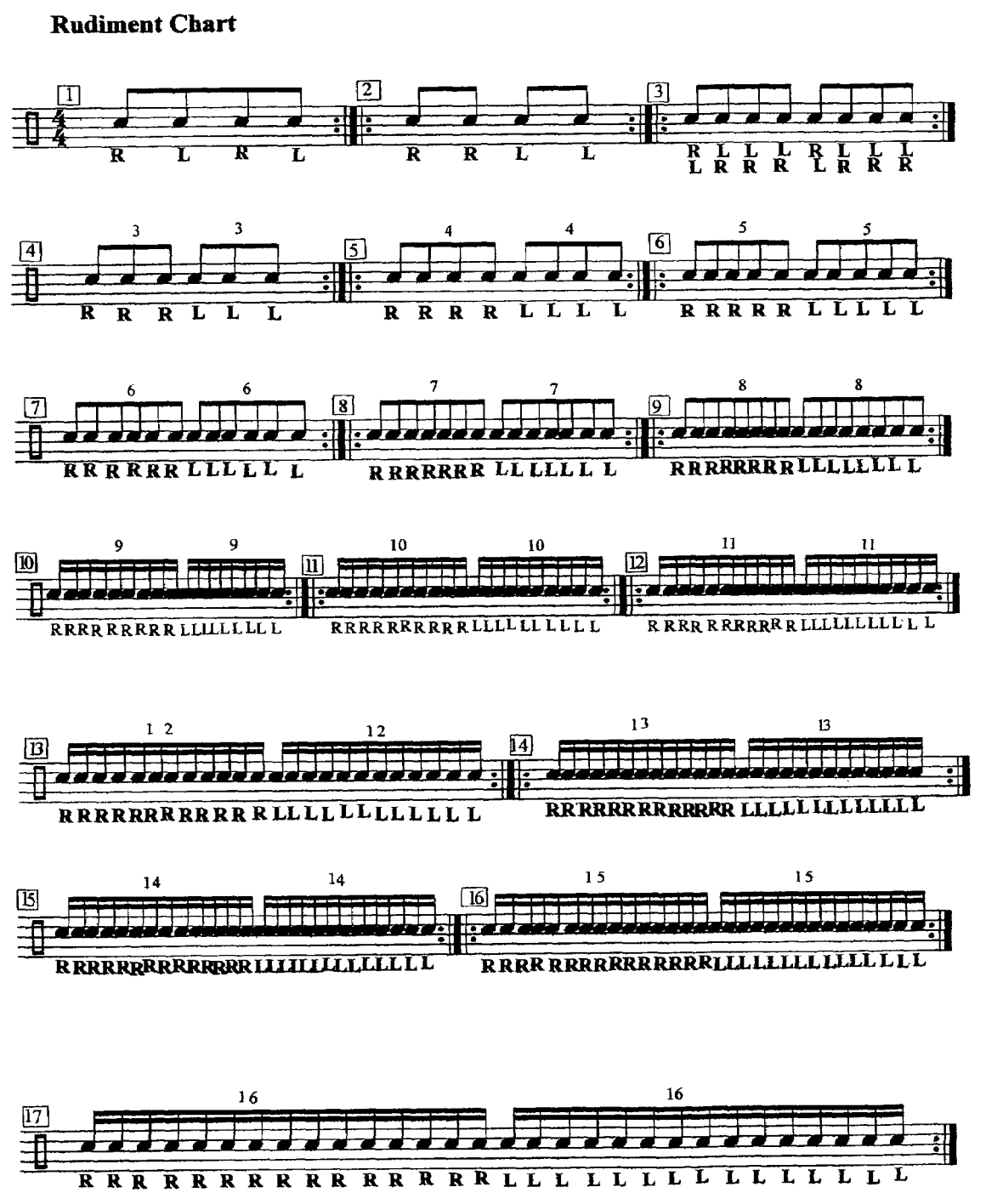

FIG. 6 depicts a rudiment chart, designed to help train the drummer while holding the stick and hand position training device 12 or 20. Although other rudiments can be implemented, the one presented is developed particularly for training the hand to maintain the proper position about the drumstick, when using the device 12, 20.

What is claimed is:

1. A percussion instrument teaching and practicing device for use with a drumstick, comprising:
   a spacer, non-integral with the drumstick, adapted to fit in the joint between the medial and proximal phalanges of the forefinger and the proximal phalange of the thumb of a user, sized and shaped to be, when in use, between and in contact with the thumb and forefinger and spaced apart from the drumstick to thereby maintain a correct drumstick holding technique during drumming,
   wherein the spacer is sized and shaped to maintain a prescribed separation between the thumb and forefinger of the user, and
   wherein the spacer is generally shaped with a diameter that varies along the length of the spacer.

2. A device as recited in claim 1, wherein the length to maximum width ratio of the spacer is greater than unity.

3. A device as recited in claim 1, wherein the spacer is generally teardrop or wedge-shaped.

4. A device as recited in claim 1, including a tether for connecting the spacer to a portion of the user's hand or wrist.

5. A device as recited in claim 4, further including a band joined to the tether and sized to connect to the hand or wrist.

6. A device as recited in claim 5, wherein the band is of adjustable diameter.

7. A device as recited in claim 1, wherein the spacer is formed of a material selected from the group consisting of wood, rubber, fiberglass and silicon.

8. A device as recited in claim 5, wherein the band is formed from a material selected from the group consisting of leather, cloth, synthetic fiber and filamentary fastening material.

9. A device as recited in claim 5, wherein the band is formed of a stretchable material.

10. A device as recited in claim 4, wherein the tether is formed of a material selected from the group consisting of yarn, leather, rubber and synthetic fiber.

11. A kit for teaching or practicing correct drumstick holding technique, comprising:
   a generally teardrop or wedge-shaped spacer adapted to fit in the joint between the medial and proximal phalanges of the forefinger and the proximal phalange of the thumb of a user, sized and shaped to be, when in use, between and in contact with the thumb and forefinger and having a diameter that varies alone the length of the spacer to thereby maintain the correct drumstick holding technique during drumming,
   a tether for connecting the spacer to a portion of the user's hand or wrist, and
   a rudiment chart for drilling the user while holding the spacer in the space between thumb and forefinger during drumming.

12. A method of developing and maintaining correct drumstick holding technique, comprising the steps of:
   positioning a generally teardrop or wedge-shaped spacer between the joint between the medial and proximal phalanges of the forefinger and the proximal phalange of the thumb and in contact with the forefinger and thumb, in which the spacer is sized and shaped, and has a diameter that varies along the length of the spacer, so as to maintain an appropriate spacing therebetween; and
   drumming while holding the spacer between the thumb and forefinger and spaced apart from the drumstick.

13. A method as recited in claim 12, including the step of adjusting axial position of the spacer within the hand for proper spacing between thumb and forefinger.

14. A method as recited in claim 12, including practicing a prescribed series of drum rudiments while holding the spacer.

* * * * *